Sept. 7, 1937.  A. WRIGHT  2,092,566
TESTER
Filed Sept. 13, 1935
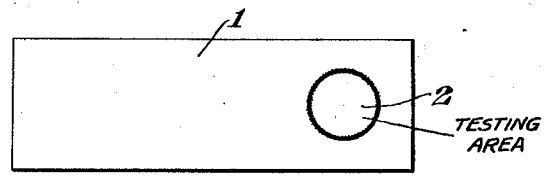
PREPARED STRIP BEFORE TESTING LIQUID
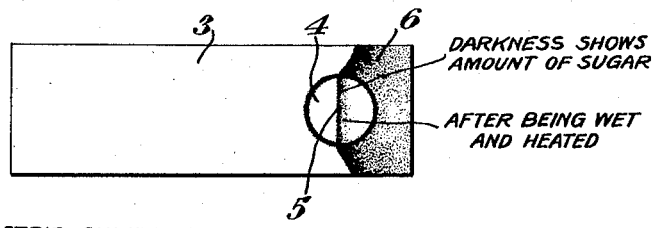
STRIP SHOWING RESULT OF TESTING
INVENTOR
Arthur Wright Patented Sept. 7, 1937

2,092,566

UNITED STATES PATENT OFFICE 2,092,566

TESTER

Arthur Wright, Forest Hills, N. Y.

Application September 13, 1935, Serial No. 40,442

11 Claims. (Cl. 23—253)

My invention relates particularly to a means for testing the presence of a sugar in liquids generally and it has relation also to means for detecting sugars in any or all physiological liquids.

The process of producing testing means of this character is contained in my copending application Ser. No. 59,371, filed January 16, 1936.

The object of my invention is to overcome the difficulty and disadvantages of previous testing means, and which usually required the heating of liquids used in testing which were none too certain in action, difficult to control, subject to deterioration on standing, or required the use of expensive equipment, such as optical polarizers. The object of my invention is, further, to enable the presence of a sugar in liquids to be readily and quickly ascertained with accuracy by a very inexpensive means, and which is also capable of being used by the layman. This makes it possible, furthermore, to carry out the tests repeatedly with expedition and accuracy and without the use of elaborate and expensive apparatus. Again, another object is to enable the test to be made by merely heating prepared paper slightly, containing the liquid to be tested. In fact the heating can be done merely with a lighted match. Another object is to provide a dry testing material which can be readily transported and which will retain testing properties indefinitely. The object is, furthermore, to provide a dry testing material containing an oxide of bismuth, preferably bismuth oxide, $Bi_2O_3$, which is pale yellow and which, with or without the presence of any of the alkali metal hydroxides, such for example as sodium hydroxide, is reduced to bismuth suboxide, BiO, which is black, or bismuth, if the test is positive, especially in the presence of glucose. Further objects will be seen from the following description of my invention, and while it is capable of embodiment in many different forms it is described in detail hereinafter only in certain embodiments thereof by way of illustration.

In the drawing:

Fig. 1 is a plan view of one of the asbestos test strips after the surface has been prepared for testing and before the test has been made; and Fig. 2 is a plan view of the same after the test has been made of the liquid to be tested and heating the same.

For example, in carrying out my invention, I may provide a sheet or strip of asbestos paper 1, preferably about .008 inch in thickness, one inch wide and three inches long, and comprised of long-fiber asbestos made with an adhesive of any desired character but usually a burnable binder such as a starch paste amounting to about 2% by weight of the entire composition and which, when dried, provides a coherent strong asbestos paper. This strip is then clamped between two flat metal washers or pieces of metal with the holes therein, preferably circular, of the same size and shape, in registry with each other, and before or after being so clamped the strip is made wet with a solution, as, for instance, a water or alcohol or glycerine solution, of any bismuth, salt, as, for example, bismuth subnitrate, $BiONO_3.H_2O$, kept in solution in water in any desired way, as, for instance, by the presence of any mineral acid, as a little nitric acid, $HNO_3$, preferably an amount of 38° Bé. nitric acid slightly more than the volume of water present. However, preferably I wet the paper with a solution of

| | Grams |
|---|---|
| Bismuth subnitrate | 2 |
| Sodium hydroxide | 10 |
| Rochelle salt sodio-potassium tartrate $(CHOH)_2COOK.COONa.4H_2O$ | 4 |
| Water | 100 cc. |

The water may be substituted partly by glycerine and the amount of the bismuth salt increased, if desired. The Rochelle salt, also the glycerine, increases the solubility of the bismuth subnitrate and the sodium hydroxide aids in the reduction of the yellow $Bi_2O_3$ to black BiO by the sugar when present. Instead of the above salts of bismuth I may use any other bismuth salt in any liquid in which it dissolves even though only very slightly soluble therein, as, for instance, bismuth nitrate, $Bi(NO_3)_3$, or bismuth, chloride $BiCl_3$, or bismuth lactate, $C_6H_9O_6Bi.7H_2O$. The above may be used with or without the presence of the alkali metal hydroxide, and dissolved in any suitable liquid, as, for example, water, but preferably in the form of a saturated solution. The bismuth lactate is comparatively readily soluble in water. As the bismuth salt, instead, I may use, if desired, bismuth subsalicylate, $C_6H_4(OH)COO.BiO$, or bismuth ammonium citrate.

The sheet or strip of asbestos paper so clamped between the washers, or metal plates, is then heated in the holes in the washers by an oxidizing flame, as, for instance, the tip of a Bunsen burner flame or a small blow pipe flame until all the starch is burned out in the areas 2 of said holes and the bismuth salt is dried out or changed to $Bi_2O_3$. The heating is preferably to a high temperature but not a red heat and not enough to melt the $Bi_2O_3$. In the area heated, the asbestos appears white, with a black ring around the heated area, due to the charred starch. The clamped washers, or plates, are then removed and the prepared dry strip 3 is now ready for the making of the test.

If now the liquid to be tested for the sugar, as, for example, glucose, before or after filtering to remove solids, is applied to the prepared strip either by putting a drop of the liquid on the circular area 4 that has been heated and which is defined by the black line, or the entire end of the strip, containing the said area, is dipped into the liquid, the said circular area, or the end of the strip 6, including the area, is then heated in an oxidizing flame, for instance either the Bunsen burner flame or even by a lighted match held under the said area of the strip. The part of the strip 6 outside of the said area will turn black due to the charring of the starch and the initial decomposition of the bismuth compound, if present there, but the portion 4 within the said area will remain white if there was no sugar present in the liquid being tested, whereas if sugar was present the circular area will become blackened at 5 by the formation of BiO, or metallic bismuth, due to the reduction of the bismuth compound present, generally $Bi_2O_3$, by the sugar. The amount of this blackening will also indicate the amount of the sugar present. For instance, if 5% of glucose is present in the liquid the circular area will become very black, but if only ½% is present it will become greyish-black, and still less will give a grey reaction. Further heating in the outside flame of the Bunsen burner will restore the circular area to a white appearance again, if desired, probably due to the formation of yellow $Bi_2O_3$, or white $Bi(OH)_3$, which can then be used in the same way over again for testing for sugar. In the above the burning of the glucose alone, without any bismuth or other compound present in the asbestos gives some slight darkening effect due to the formation of carbon, so that if a not very delicate test is desired the strip with the burned-out asbestos area without any other substance, can be used for the sugar test. It may be partly this carbon formed by the heating of the glucose, which reacts with the $Bi_2O_3$ to reduce the same to either BiO or Bi or a mixture of both, while being heated, giving the black reaction.

Many changes may be made in the above procedure and compositions, if desired. For instance, the circular area may be even provided with its bismuth compound by applying $Bi_2O_3$ directly to the previously heated area with or without any adhesive and then heated to burn out the adhesive before applying the liquid to be tested.

In all of the above the uncharred area outside of the circle acts as a convenient flexible non-fragile holding portion when testing the liquid and, also, acts to hold, without breaking, the circular heated area of asbestos, which otherwise would be so fragile to hold while making the test, as to be undesirable. Besides, as a result of the heating the charring of this outside area to an intense black provides a sharp contrast to the circular testing area, which is an aid to the eye in testing.

While I have described my invention above in detail I wish it to be understood that many changes may be made therein without departing from the spirit of my invention.

I claim:

1. A glucose tester comprising a sheet of heat resistant material having a surface of light color, containing a substance reducible by glucose, said material being adapted to absorb a glucose-containing liquid and show a dark color on said surface when heated.

2. A glucose tester comprising a sheet of heat resistant material containing bismuth oxide reducible to a black bismuth-containing substance, having a surface of light color, said material being adapted to absorb a glucose-containing liquid and show a dark color on said surface when heated.

3. A glucose tester comprising a sheet of heat-resistant material containing bismuth oxide reducible to a black bismuth-containing substance and an alkali metal hydroxide, having a surface of light color, said material being adapted to absorb a glucose-containing liquid and show a dark color on said surface when heated.

4. A glucose tester comprising a sheet of heat-resistant material containing bismuth oxide reducible to a black bismuth-containing substance and sodium hydroxide, having a surface of light color, said material being adapted to absorb a glucose-containing liquid and show a dark color on said surface when heated.

5. A glucose tester comprising a sheet of heat-resistant material comprising a sheet of asbestos bound together with starch, having a surface of light color containing a substance reducible by glucose from which the starch has been burned out, said material being adapted to absorb a glucose-containing liquid and show a dark color on said surface when heated.

6. A glucose tester comprising a sheet of heat-resistant material containing heated bismuth subnitrate reducible to a black bismuth-containing substance, having a surface of light color, said material being adapted to absorb a glucose-containing liquid and show a dark color on said surface when heated.

7. A glucose tester comprising a sheet of heat-resistant material containing heated bismuth subnitrate reducible to a black bismuth-containing substance and sodium hydroxide, having a surface of light color, said material being adapted to absorb a glucose-containing liquid and show a dark color on said surface when heated.

8. A glucose tester comprising a sheet of heat-resistant material containing heated bismuth subnitrate reducible to a black bismuth-containing substance and sodium hydroxide deposited from a solution thereof in water with Rochelle salt, having a surface of light color, said material being adapted to absorb a glucose-containing liquid and show a dark color on said surface when heated.

9. A glucose tester comprising a sheet of heat-resistant material comprising a sheet of asbestos bound together with a burnable binder, containing heated bismuth subnitrate reducible to a black bismuth-containing substance, having a surface of light color from which the binder has been burned out, said material being adapted to absorb a glucose containing liquid and show a dark color on said surface when heated, said surface being enclosed within a portion of said sheet still containing the burnable binder.

10. A glucose tester comprising a thin sheet of heat-resistant material comprising a sheet of asbestos bound together with a burnable binder, having a thin fragile surface of light color from which the burnable binder has been burned out, said material being adapted to absorb a glucose-containing liquid and show a dark color on said surface when heated with a small flame, such as the flame of a match, said surface being enclosed within a thin flexible portion of said sheet still containing the burnable binder.

11. A sheet of asbestos having a binder in a portion thereof around a portion of said sheet containing a light-color substance reducible by glucose to a dark substance, said second-named portion not containing a burnable binder.

ARTHUR WRIGHT.